United States Patent
Faris et al.

(10) Patent No.: US 6,977,695 B2
(45) Date of Patent: Dec. 20, 2005

(54) VARIABLE OPTICAL ATTENUATOR BASED ON ELECTRICALLY SWITCHABLE CHOLESTERIC LIQUID CRYSTAL REFLECTIVE POLARIZERS

(75) Inventors: Sadeg M. Faris, Pleasantville, NY (US); Zhan He, Chappaqua, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/648,039

(22) Filed: Aug. 26, 2003

(65) Prior Publication Data

US 2004/0141120 A1 Jul. 22, 2004

Related U.S. Application Data

(63) Continuation-in-part of application No. 10/281,569, filed on Oct. 28, 2002, and a continuation-in-part of application No. 10/213,523, filed on Aug. 7, 2002, now Pat. No. 6,805,776, and a continuation-in-part of application No. 09/993,036, filed on Nov. 6, 2001, now Pat. No. 6,710,823, and a continuation-in-part of application No. 09/380,256, filed on Aug. 25, 1999, now abandoned, and a continuation-in-part of application No. 09/354,192, filed on Jul. 15, 1999, now Pat. No. 6,583,827, and a continuation-in-part of application No. 09/093,017, filed on Jun. 5, 1998, now Pat. No. 6,473,143, and a continuation-in-part of application No. 09/032,302, filed on Feb. 27, 1998, now Pat. No. 6,559,903, and a continuation-in-part of application No. 08/805,603, filed on Feb. 26, 1997, now Pat. No. 5,940,150.

(60) Provisional application No. 60/406,013, filed on Aug. 26, 2002.

(51) Int. Cl.[7] .............................................. G02F 1/1335
(52) U.S. Cl. ......................................... 349/98; 349/115
(58) Field of Search ................... 349/98, 115; 359/487; 345/87

(56) References Cited

U.S. PATENT DOCUMENTS

| | | |
|---|---|---|
| 3,679,290 A | 7/1972 | Adams et al. ............... 350/157 |
| 3,711,181 A | 1/1973 | Adams, Jr. et al. .......... 350/157 |
| 3,986,022 A | 10/1976 | Hyatt ............................ 349/16 |
| 4,073,571 A | 2/1978 | Grinberg et al. ............... 359/40 |
| 4,097,130 A | 6/1978 | Cole, Jr. ........................ 349/79 |
| 4,475,031 A | 10/1984 | Mockovciak, Jr. ........... 349/116 |
| 4,566,758 A | 1/1986 | Bos .............................. 349/128 |
| 4,579,422 A | 4/1986 | Simoni et al. ............... 349/176 |
| 4,641,922 A | 2/1987 | Jacob ............................ 349/16 |
| 4,663,083 A | 5/1987 | Marks ......................... 359/296 |
| 4,719,507 A | 1/1988 | Bos .............................. 359/465 |
| 4,728,547 A | 3/1988 | Vaz et al. ...................... 349/16 |
| 4,749,261 A | 6/1988 | McLaughlin et al. .......... 349/16 |
| 4,750,814 A | 6/1988 | Suzuki .......................... 349/16 |
| 4,890,902 A | 1/1990 | Doane et al. .................. 349/94 |
| 4,902,112 A | 2/1990 | Lowe ........................... 359/489 |
| 4,964,251 A | 10/1990 | Baughman et al. ............ 349/16 |
| 4,975,522 A | 12/1990 | Ratzsch et al. .............. 528/272 |
| 5,015,086 A | 5/1991 | Okaue et al. .................. 349/13 |
| 5,113,270 A | 5/1992 | Fergason ....................... 349/14 |
| 5,152,111 A | 10/1992 | Baughman et al. ............ 349/16 |
| 5,188,760 A | 2/1993 | Hikmet et al. ............... 252/299 |
| 5,193,015 A | 3/1993 | Shanks ........................ 349/110 |
| 5,197,242 A | 3/1993 | Baughman et al. ............ 349/16 |
| 5,200,845 A | 4/1993 | Crooker et al. ................ 359/51 |
| 5,221,982 A | 6/1993 | Faris ........................... 349/115 |
| 5,325,218 A | 6/1994 | Willett et al. ................. 349/74 |

(Continued)

*Primary Examiner*—Tarifur R. Chowdhury
(74) *Attorney, Agent, or Firm*—Ralph J. Crispino

(57) ABSTRACT

Variable optical attenuators (VOAs) are provided, based on electrically switchable CLC reflective polarizers. The reflectivity of the described reflective VOAs can theoretically be electrically adjusted between 0% to 100%, and the reflective bandwidth can be easily adjusted. In general, the VOA includes a pair of switchable CLC polarizers and a driver for driving the polarizers. When the electric fields on both polarizers are off, the polarizers serve as two reflective mirrors. When the fields are turned on, the two polarizers are switched into two transparent sheets allowing light to transmit therethrough. Continuously changing the voltages on the two polarizers electrically adjusts the attenuation.

2 Claims, 2 Drawing Sheets

U.S. PATENT DOCUMENTS

| | | | |
|---|---|---|---|
| 5,327,285 A | 7/1994 | Faris | 359/489 |
| 5,399,390 A | 3/1995 | Akins | 349/158 |
| 5,408,187 A | 4/1995 | Mackie | 307/400 |
| 5,418,631 A | 5/1995 | Tedesco | 359/15 |
| 5,437,811 A | 8/1995 | Doane et al. | 252/299.5 |
| 5,498,450 A | 3/1996 | Akashi et al. | 252/299.01 |
| 5,506,704 A | 4/1996 | Broer et al. | 359/63 |
| 5,558,813 A | 9/1996 | Akashi et al. | 252/299 |
| 5,570,216 A | 10/1996 | Lu et al. | 349/175 |
| 5,589,959 A | 12/1996 | Hikmet | 349/88 |
| 5,650,865 A | 7/1997 | Smith | 359/15 |
| 5,667,897 A | 9/1997 | Hashemi et al. | 428/426 |
| 5,686,979 A * | 11/1997 | Weber et al. | 349/96 |
| 5,691,789 A | 11/1997 | Li et al. | 349/98 |
| 5,691,795 A | 11/1997 | Doane et al. | 349/115 |
| 5,699,133 A | 12/1997 | Furuta | 349/13 |
| 5,762,823 A | 6/1998 | Hikmet | 349/13 |
| 5,796,454 A | 8/1998 | Ma | 349/98 |
| 5,798,057 A | 8/1998 | Hikmet | 252/299 |
| 5,940,150 A | 8/1999 | Faris | 349/16 |
| 6,071,438 A | 6/2000 | Leigeber et al. | 252/585 |
| 6,072,549 A * | 6/2000 | Faris et al. | 349/16 |
| 6,320,631 B1 | 11/2001 | Okada et al. | 349/86 |
| 6,369,868 B1 | 4/2002 | Fan et al. | 349/115 |
| 6,473,143 B2 | 10/2002 | Li et al. | 349/88 |
| 6,633,354 B2 | 10/2003 | Li et al. | 349/115 |
| 6,697,133 B2 | 2/2004 | Fan et al. | 349/98 |

* cited by examiner

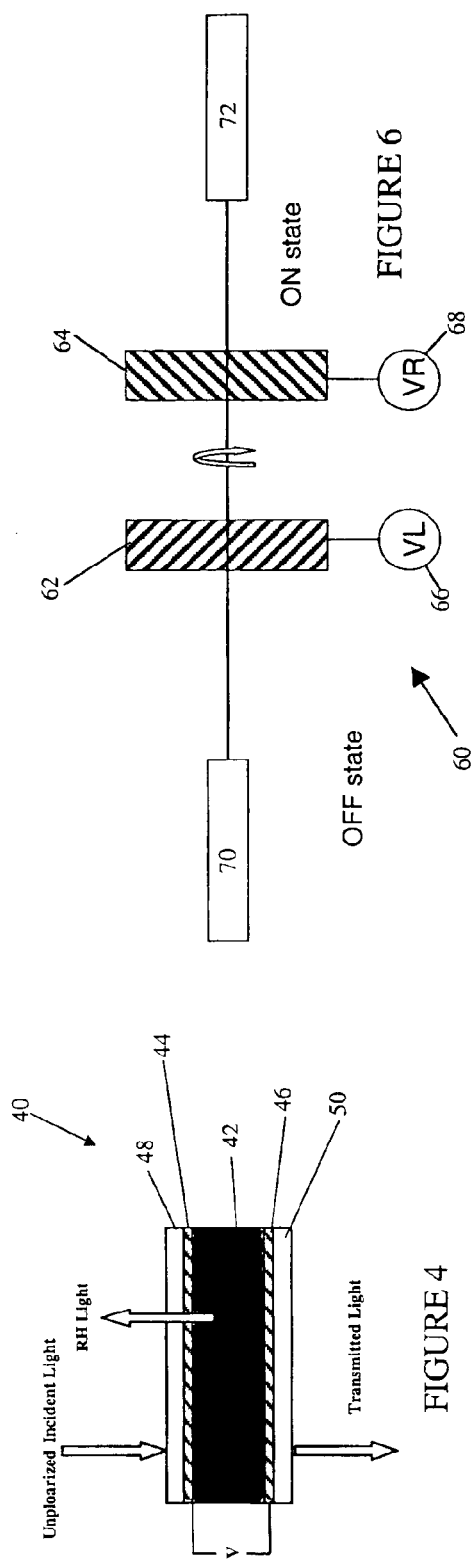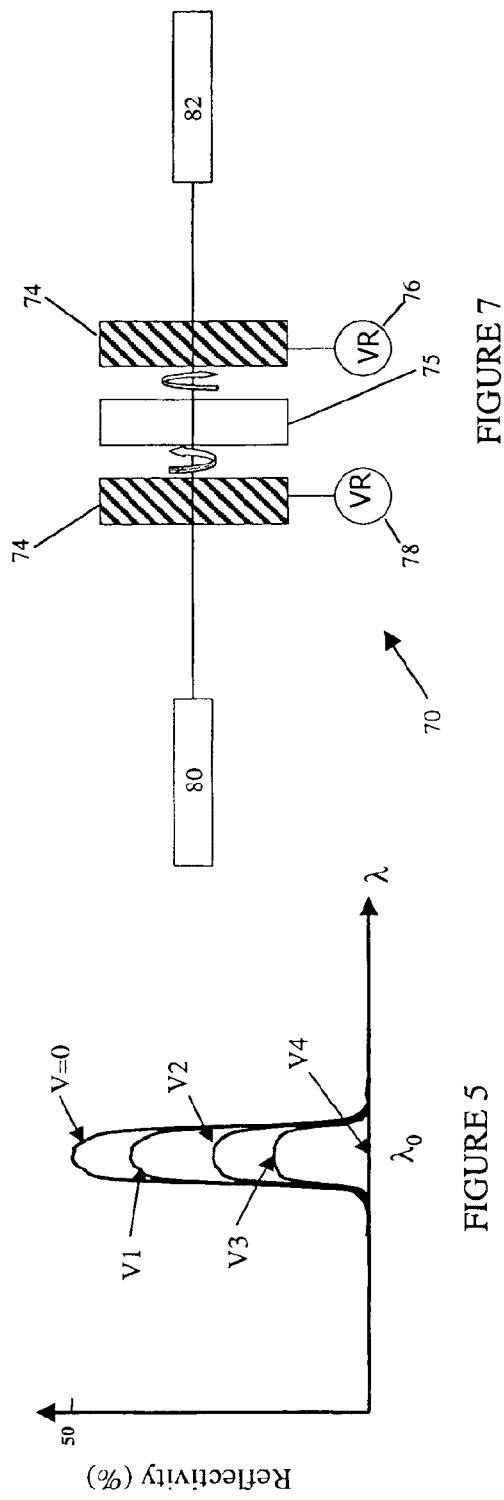

VARIABLE OPTICAL ATTENUATOR BASED ON ELECTRICALLY SWITCHABLE CHOLESTERIC LIQUID CRYSTAL REFLECTIVE POLARIZERS

RELATED APPLICATIONS

The present invention is related to U.S. Provisional Patent Application Ser. No. 60/406,013 filed on Aug. 26, 2002 entitled "Variable Optical Attenuator Based on Electrically Switchable Cholesteric Liquid Crystal Reflective Polarizers", and also is a Continuation in Part of U.S. patent application Ser. No. 09/993,036 filed on Nov. 6, 2001 now U.S. Pat. No. 6,710,823 entitled "Electro-Optical Glazing Structures Having Reflection and Transparent Modes of Operation"; U.S. patent application Ser. No. 09/380,256 filed on Aug. 25, 1999 entitled "Electro-Optical Glazing Structures Having Reflection and Transparent Modes of Operation" now abandoned; U.S. patent application Ser. No. 09/032,302 filed on Feb. 27, 1998 now U.S. Pat. No. 6,559,903 entitled "Electro-Optical Glazing Structures Having Reflection and Transparent Modes of Operation"; U.S. Pat. No. 5,940,150 (Ser. No. 08/805,603) filed on Feb. 26, 1997 entitled "Electro-Optical Glazing Structures Having Total-Reflection and Transparent Modes of Operation for Use in Dynamical Control of Electromagnetic Radiation"; U.S. patent application Ser. No. 09/354,192 filed on Jul. 15, 1999 now U.S. Pat. No. 6,583,827 entitled "Electro-Optical Glazing Structures Having Total-Reflection and Transparent Modes of Operation for Use in Dynamical Control of Electromagnetic Radiation"; U.S. patent application Ser. No. 09/093,017 filed on Jun. 5, 1998 now U.S. Pat. No. 6,473,143 entitled "Broadband Switchable Polarizer", now U.S. Pat. No. 6,473,143; Ser. No. 10/213,523 filed Aug. 7, 2002 now U.S. Pat. No. 6,805,776 and U.S. patent application Ser. No. 10/281,569 filed on Oct. 28, 2002 entitled "Broadband Switchable Polarizer"; all of which are incorporated by reference herein.

BACKGROUND OF THE INVENTION

1. Field of the Invention

The present invention relates generally to variable optical attenuators, and particularly to variable optical attenuator based on electrically switchable cholesteric liquid crystal reflective polarizers.

2. Description of the Prior Art

Variable optical attenuators (VOA) play a key role in current fiber optic communications. The application areas of VOAs include power level control into receivers, power control into various optical modules or sub-modules, gain-tilt control or power equalization in optical amplifier networks.

Currently there are several forms of VOAs that have been proposed. An illustration of such proposed VOAs are set forth in the following: J. M. Hartley, et.al. U.S. Pat. No. 6,253,017 (2001) disclosing a mechanically rotating VOA; C. E. Lance, et.al. U.S. Pat. No. 4,516,827 (1985) disclosing a moving optical attenuator disc; T. Iwakiri, et.al. U.S. Pat. No. 4,893,889 (1990) disclosing a VOA with an air gap between coupled fiber ends for attenuating optical power; V. R. Dhuler, et.al. U.S. Pat. No. 6,275,320 (2001) disclosing a micro-electro-mechanical system (MEMS) VOA; S. Iwatsuka, et.al. U.S. Pat. No. 5,477,376 (1995) disclosing a magneto or acoustic optical attenuator; and V. N. Morozov, et.al. U.S. Pat. No. 6,208,798 (2001) disclosing a VOA with thermo-optic attenuator and liquid crystal (LC) attenuator. Among the various forms of VOA, LC based optical attenuators have attracted much attention due to some unique features such as no moving parts, low insertion loss and low power consumption.

Current LC attenuators may be classified into two types: polarization-control and scattering. An example of polarization-controlled LC attenuators is as followed: K. Y. Wu, et.al. U.S. Pat. No. 5,963,291 (1999) disclosing a VOA with a polarization modulation with a feedback controller; R. Albert, et.al. U.S. Pat. No. 6,111,633 (2000) disclosing a polarization independent optical switch for selectively switching an optical signal; J. J. Pan, U.S. Pat. No. 5,276,747 (1994) disclosing an optical device that controls the strength of the optical signal; S. H. Rumbaugh, et.al. U.S. Pat. No. 5,015,057 (1991) disclosing a polymer-dispersed liquid crystal (PDLC) which provides attenuation control over attenuation values.

In polarization-controlled LC attenuators, unpolarized incident light is usually split by optical crystal or polarizing beam splitter into two linearly polarized beams with perpendicularly polarized directions. By transmitting through a LC cell, the polarization states of the two beams can be controlled by a voltage applied into the LC cell. Depending on the voltage level, the amount of light that can be coupled into output fiber can be adjusted. Thus optical attenuation is electrically achieved. However, polarization-control based VOAs usually require beam displacers or polarizing beam splitters to split the incident light and re-combine them, which causes alignment difficulty and high cost. Further, the attenuation bandwidths are not easily adjusted.

On the other hand, the scattering based LC attenuators utilize the light scattering effect from a so-called polymer dispersed liquid crystal (PDLC) device. Such is the occurrence in W. J. Sinclair, et.al. U.S. Pat. No. 4,364,639 (1982) which discloses a scattering liquid crystal cell whose optical transmission can be varied. In such a device, the incident light is scattered into all directions due to the index-miss-matching between the LCs and the polymer networks, when no electric field is applied. Thus, the maximum attenuation ratio can be reached. When a reasonable high voltage is applied into the device, the LC molecules are oriented align the electric direction, which causes disappearance of index-miss-matching. The light can transmit through the device with minimum insertion loss. However, PDLC scattering based VOAs cannot totally block the light due to its scattering effect. The dynamic range usually is small. Further, the attenuation bandwidths are not easily adjusted.

Shortcomings of conventional VOAs include: no reflective mode VOAs; no variability of attenuation bandwidth; high cost; and difficulty of fabrication. Therefore, a need remains in the art for reflective mode VOAs, variability of attenuation bandwidth; and VOAs that are conveniently fabricated.

SUMMARY OF THE INVENTION

The above-discussed and other problems and deficiencies of the prior art are overcome or alleviated by the several methods and apparatus of the present invention for VOAs based on electrically switchable CLC reflective polarizers. These VOAs are improvements over conventional VOAs in that:

There is no need for polarization splitters and combiners;
Performance enhancement, as the reflectivity of herein described reflective VOAs can theoretically be electrically adjusted between 0% to 100%;
The reflective bandwidth can be easily adjusted;
Easy integration;

Minimal size and weight; and

Low cost.

The herein VOA includes: a right-handed switchable CLC polarizer and a left-handed switchable CLC polarizers, and an electric driver for driving the polarizers. When the electric fields on both polarizers are off, the polarizers serve as two reflective mirrors, which reflect left-hand circularly polarized light by LH CLC polarizer and right-hand circularly polarized light by RH CLC polarizer. When the fields are turned on, the two polarizers are switched into two transparent sheets allowing light to transmit therethrough. Continuously changing the voltages on the two polarizers electrically adjusts the attenuation.

In another embodiment, the herein VOA includes a first and second switchable CLC polarizer of the same handedness; a half-wave plate between the first and second switchable CLC polarizers for converting the transmitted light from the first polarizer into opposite handiness; and electric drivers for driving the polarizers. When the electric fields on both polarizers are off, the polarizers serve as two reflective mirrors, which reflect the same handedness circularly polarized light by the first polarizer, converts the opposite handedness circularly polarized light to the same handedness circularly polarized, and reflects the converted the same handedness circularly polarized by the second polarizer. When the fields are turned on, the two polarizers are switched into two transparent sheets allowing light to transmit therethrough. Continuously changing the voltages on the two polarizers electrically adjusts the attenuation.

The above-discussed and other features and advantages of the present invention will be appreciated and understood by those skilled in the art from the following detailed description and drawings.

BRIEF DESCRIPTION OF THE DRAWINGS

FIG. 4 illustrates the basic structure of a single electrically switchable RH CLC reflective polarizer;

FIG. 5 shows reflectivity of an electrically switchable CLC reflective polarizer as a function of the applied voltage;

FIG. 6 illustrates a basic structure of a switchable CLC polarizer based VOA according to the invention herein;

FIG. 7 illustrates an alternative embodiment of a switchable CLC polarizer based VOA according to the invention herein;

DETAILED DESCRIPTION OF THE ILLUSTRATIVE EMBODIMENTS

Herein disclosed is a novel technology to fabricate electrically variable optical attenuator by using electrically switchable cholesteric liquid crystal (CLC) polarizers. This type of CLC polarizers has special cholesteric liquid crystal polymerized structure with proper low-molecule liquid crystals. When the electric field is off, the reflectivity for a single layer in a wavelength range can reach about 50% for unpolarized light. If two CLC layers with opposite helical handiness are integrated together, the reflectivity in the narrow reflective band can be close to 100% theoretically. When an electric field is applied into the layers, the reflectivity in the reflective bands can gradually decrease to zero, resulting in full transparent sheets. These CLC polarizers are described in more detail in U.S. patent application Ser. No. 09/993,036 filed on Nov. 6, 2001 entitled "Electro-Optical Glazing Structures Having Reflection and Transparent Modes of Operation"; U.S. patent application Ser. No. 09/380,256 filed on Feb. 25, 1998 entitled "Electro-Optical Glazing Structures Having Reflection and Transparent Modes of Operation"; U.S. patent application Ser. No. 09/032,302 filed on Feb. 27, 1998 entitled "Electro-Optical Glazing Structures Having Reflection and Transparent Modes of Operation"; U.S. Pat. No. 5,940,150 (Ser. No. 08/805,603) filed on Feb. 26, 1997 entitled "Electro-Optical Glazing Structures Having Total-Reflection and Transparent Modes of Operation for Use in Dynamical Control of Electromagnetic Radiation"; U.S. patent application Ser. No. 09/354,192 filed on Jul. 15, 1999 entitled "Electro-Optical Glazing Structures Having Total-Reflection and Transparent Modes of Operation for Use in Dynamical Control of Electromagnetic Radiation"; U.S. patent application Ser. No. 09/093,017 filed on Jun. 5, 1998 entitled "Broadband Switchable Polarizer", now U.S. Pat. No. 6,473,143; and U.S. patent application Ser. No. 10/281,569 filed on Oct. 28, 2002 entitled "Broadband Switchable Polarizer"; all of which are incorporated by reference herein in their entireties.

As mentioned above, the reflective VOAs described herein are based on unique optical properties of CLC films. We will briefly describe the fundamental of CLC films in general first, and then we will discuss the electrical switchability of some special CLC films.

Figure 1:
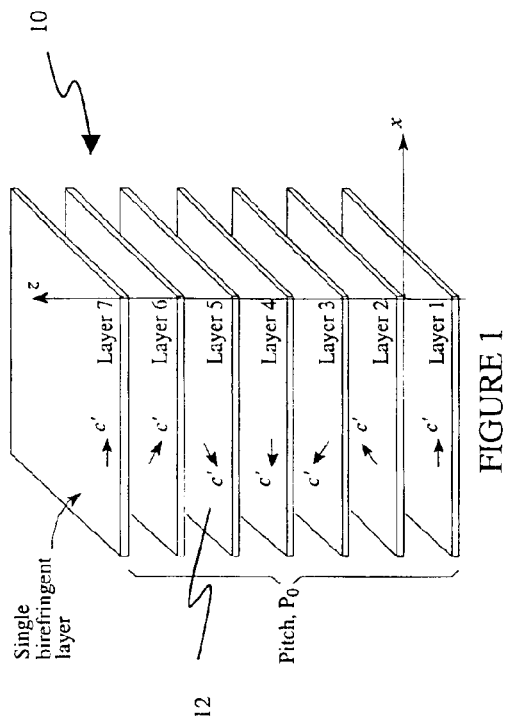
FIG. 1 shows a CLC film in the helical planar configuration including a stack of aligned molecular planes, whereby successive planes are rotated about the z-axis either clockwise or counterclockwise by an equal amount, tracing either a left-handed or right-handed helix along the z-axis, wherein the pitch, $P_0$, is the thickness of one cyclical stack.

A CLC film consists of a stack 10 of thousands of molecular planes, as shown in FIG. 1. Each plane is made of cigar-shaped liquid crystal molecules 12 that align themselves in a common direction, denoted by c'. Thousands of these aligned molecular planes, in turn, stack together so that the orientation of each molecular plane is rotated slightly from the adjacent plane, forming a continuous helix. The pitch $P_0$ of the helix is the stack thickness needed for the planes to rotate by 360°.

The materials can be formulated to form either a left-handed (counter-clockwise) helix or a right-handed (clockwise) helix, which orients perpendicular to the surface of the film. This helical planar configuration gives rise to unusual optical properties: the circularly polarized light with the handiness same as the CLC layer and also the wavelength in the reflective band determined by the pitch distributions will be totally reflected, while the light with the opposite handiness, or other wavelengths will transmit through the layer without any effects.

Figure 2A:
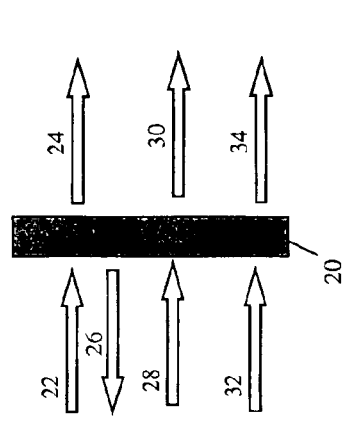
FIGS. 2A and 2B show optical properties of a right-handed CLC layer.
Figure 2B:
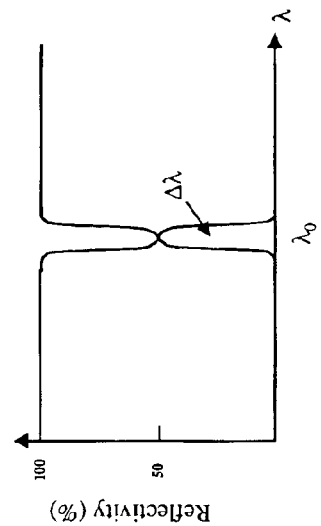

The width of the reflection band and the characteristic wavelength of the selective reflection can be engineered by altering the composition and processing technique. Referring now to FIGS. 2A and 2B, a schematic of operation of a film 20 used in embodiments of the present invention is shown. A thin film 20 with a right-handed (RH) helical pitch $P_0$ and average refractive index $n_{ave}$ reflects right-circularly polarized light in the reflection band having a characteristic wavelength: $\lambda_0 = n_{ave} P_0$. For example, when a beam 22 of circularly polarized light in the reflective band impinges on the film 20, left-circularly polarized light is transmitted 24 at this wavelength, and right-circularly polarized light is reflected 26 at this wavelength, functioning as a RH circular polarizer. Note that overall, 50% of light from beam 22 is reflected and 50% is transmitted. A left-handed helical pitch film functions similarly but at opposite handedness. An impinging beam 28 consisting of right-circularly polarized light out of the reflective band will be transmitted 30. Further, an impinging beam 32 consisting of left-circularly polarized light in or out of the reflective band will be transmitted 34.

The bandwidth is given by $\Delta\lambda \approx (\Delta n/n_{ave})\lambda_0$, where $\Delta n=n_e-n_o$ is the birefringence of the film. The bandwidth and position are very easily changed to satisfy different applications.

Figure 3:
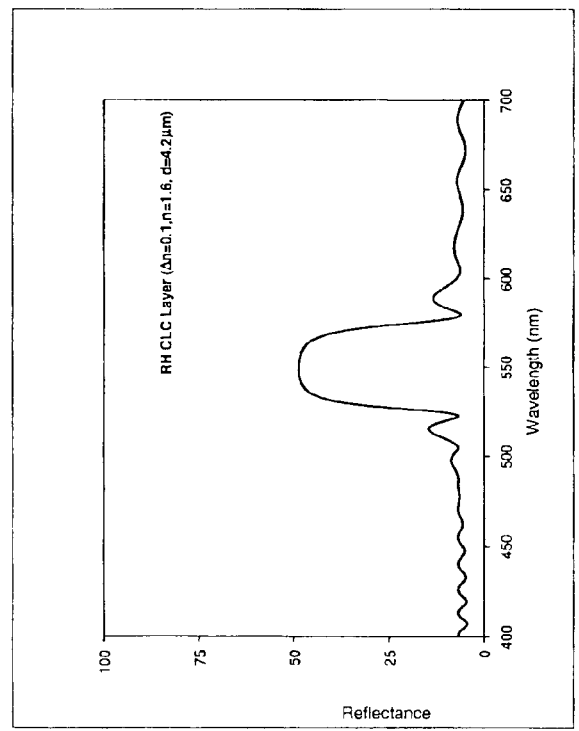
FIG. 3 shows a computer simulation result of an RH CLC film.

FIG. 3 shows a computer simulation of a CLC film, where the average index of the CLC material is 1.6, the birefringence $\Delta n$ is 0.1, and the selective reflection wavelength is chosen at 550 nm. The simulation demonstrates clearly that, in principle, a high reflection peak at 550 nm is achievable.

By choosing proper small $\Delta n$ materials, the reflection bandwidth can be adjusted. As the $\Delta n$ value is increases, the bandwidth increases.

Electrically switchable CLC reflective polarizers may be formed by choosing proper polymerizable CLC materials, low molecular materials and other materials. Example of such materials can be found as followed: J. F. Li, et.al. U.S. Pat. No. 6,473,143 disclosing a polymerized polymer network; R. A. M. Hikmet, U.S. Pat. No. 5,798,057 (1998) disclosing a mixture of polymerizable. The basic configuration of electrically switchable CLC reflective polarizer is similar to the passive CLC layer except for two transparent and conductive substrates instead of non-conductive substrates.

In FIG. 4 the basic structure of an electrically switchable CLC reflective polarizer 40 is illustrated. The electrically switchable CLC reflective polarizer 40 includes a CLC right-handed layer 42; conductive layers 44, 46 on opposite sides of the layer 42; and transparent layers 48, 50 opposite each conductive layer 44, 46, respectively. A DC or AC power circuit is used to drive the layer.

The reflective properties of such a CLC layer 42 can be varied and even eliminated by an external electric field, as shown in FIG. 5. When V=0, 50% reflectivity for a single CLC layer with either LH or RH. As increasing the applied voltage V, the reflectivity decreases from 50% to almost zero. Moreover, such a switchable behavior is reversible.

The basic structure of the herein described VOAs is illustrated in FIG. 6, wherein a VOA 60 is provided, associated with an input collimator 70 and an output collimator 72 Two switchable CLC polarizers are provided. A left-handed (LH) CLC polarizer 62 and a right-handed (RH) CLC polarizer 64. Two electric drivers 66, 68 are used to drive the polarizers individually. When the electric fields on both polarizers are off, the two polarizers perform as two reflective mirrors, which totally reflect left-hand circularly polarized light by LH CLC polarizer and right-hand circularly polarized light by RH CLC polarizer. The transmission is zero theoretically, which could provide a large variable insertion loss range. When the fields are turned on, the two polarizers are switched into two transparent sheets. The light can transmit through them without any losses. The insertion loss (IL) could be very small. By continuously changing the voltages on the two polarizers, the attenuation of the device can be electrically adjusted.

In an alternative embodiment, and referring now to FIG. 7, a VOA 70 is provided, associated with an input collimator 80 and an output collimator 82. Two switchable CLC polarizers of the same handedness are provided. A pair of right-handed (RH) CLC polarizers 74 are associated with two electric drivers 76, 78 to drive the polarizers individually. Between the two polarizers, a half-wave plate 75 is inserted, which converts the transmitted light after the front polarizer into opposite handiness. The second polarizer will reflect the polarization-converted light.

The individual driving gives is advantageous in that the PDL level may be minimized, since one can adjust the voltage VR/VL or VR/VR to keep the reflectivity for both handiness lights at the same levels. Thus, PDL could keep very small in the whole attenuation range.

The fabrication process of electrically switchable CLC reflective polarizer is similar to that for passive CLC reflective polarizers. The carefully selected CLC materials and non-reactive, low molecular LC materials with some other materials such as chiral materials are well mixed. Two transparent and conductive substrates such as ITO substrates are spin-coated by polymides. After a baking process, the substrates are rubbed undirectionally. The two substrates are overlapped together with proper spacers to control the thickness of the cell. Then, the mixture of LC materials is filled into the cell. After UV curing treatment, the electrically switchable CLC reflective polarizer is prepared.

The selectively reflective wavelength depends on the CLC materials and also the relative ratios between those materials. Also, the UV curing condition may change this wavelength. The bandwidth of the reflective peak is a function of the effective birefringence and also curing process.

The mechanism of the switchable behavior can be explained as follows. When an electric field is applied onto the layer, the low molecular LCs are oriented by following the electric field, which will deform the helix structure. As the voltage is increased, the deformation of the helix structure becomes large, resulting in decrease of the reflectivity of the layer. When the voltage is high enough, the helix structure disappears, so that the reflectivity of the layer drops to zero. Because the helical polymer network has a little elastic flexibility, the helix structure will appear after the voltage is removed. Thus, the switching is reversible.

One of recipes for such an electrically switchable CLC layer has been published in R. A. M. Hikmet, et.al., Liquid Crystals, Vol. 26, No. 11 pp. 1645–1653 (1999): 30 wt % chiral acrylate monomer CBC6, 44 wt % BL64 low molecular LC, 26 wt % chiral material CB15, and 0.6 wt % dia-acrylate monomer C6M. The reflective wavelength is about 540 nm and bandwidth is about 50 nm. The layer can be switched from 32 V and ended at 34 V.

Using the herein described VAO, the following benefits may be attained. A reflective mode VOA according to the present invention has reflectivity properties that can be electrically changed between 0 and 100%. A controllable band reflective VOAs according to the present invention can be controlled to cover C bands and L bands, as used in the optical communication fields. One embodiment of the reflective VOA utilizes a single handedness. Another embodiment of the reflective film utilizes two opposite handedness.

There are several unprecedented advantages of this technology over other technologies, including the following:

Electrically controllable attenuation. Theoretically, the attenuation in the reflective band can be electrically adjusted between 0% and 100%.

Easy integration. No beam displacers or polarizing beam splitters are needed.

Minimal size and weight to increase comfort during use.

Low cost.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A variable optical attenuator comprising:
    a right-handed switchable CLC polarizer and a left-handed switchable CLC polarizers, and
    an electric driver for driving the polarizers,
  wherein when the electric fields on both polarizers are off, the polarizers serve as two reflective mirrors, which reflect left-hand circularly polarized light by LH CLC polarizer and right-hand circularly polarized light by RH CLC polarizer, and
  wherein when the fields are turned on, the two polarizers are switched into two transparent sheets allowing light to transmit therethrough; and
  whereby continuously changing the voltages on the two polarizers electrically adjusts the attenuation.

2. The variable optical attenuator as in claim 1, comprising an electrical driver for each polarizer.

* * * * *